Figure 5:
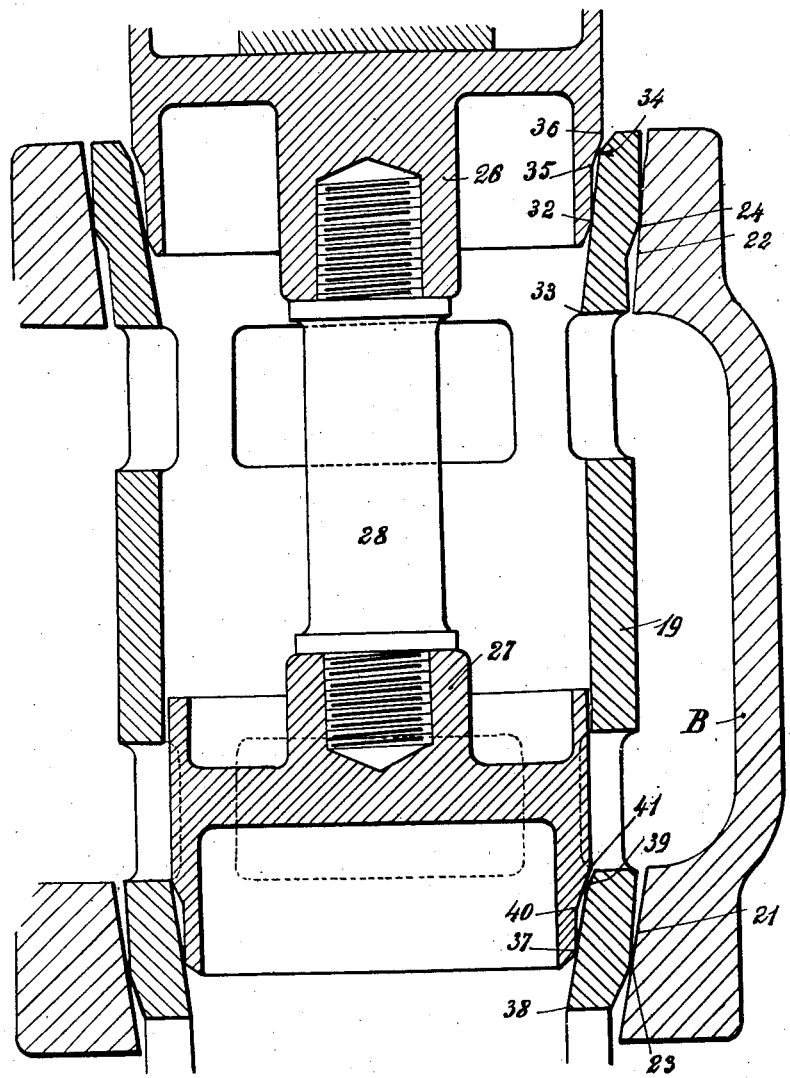

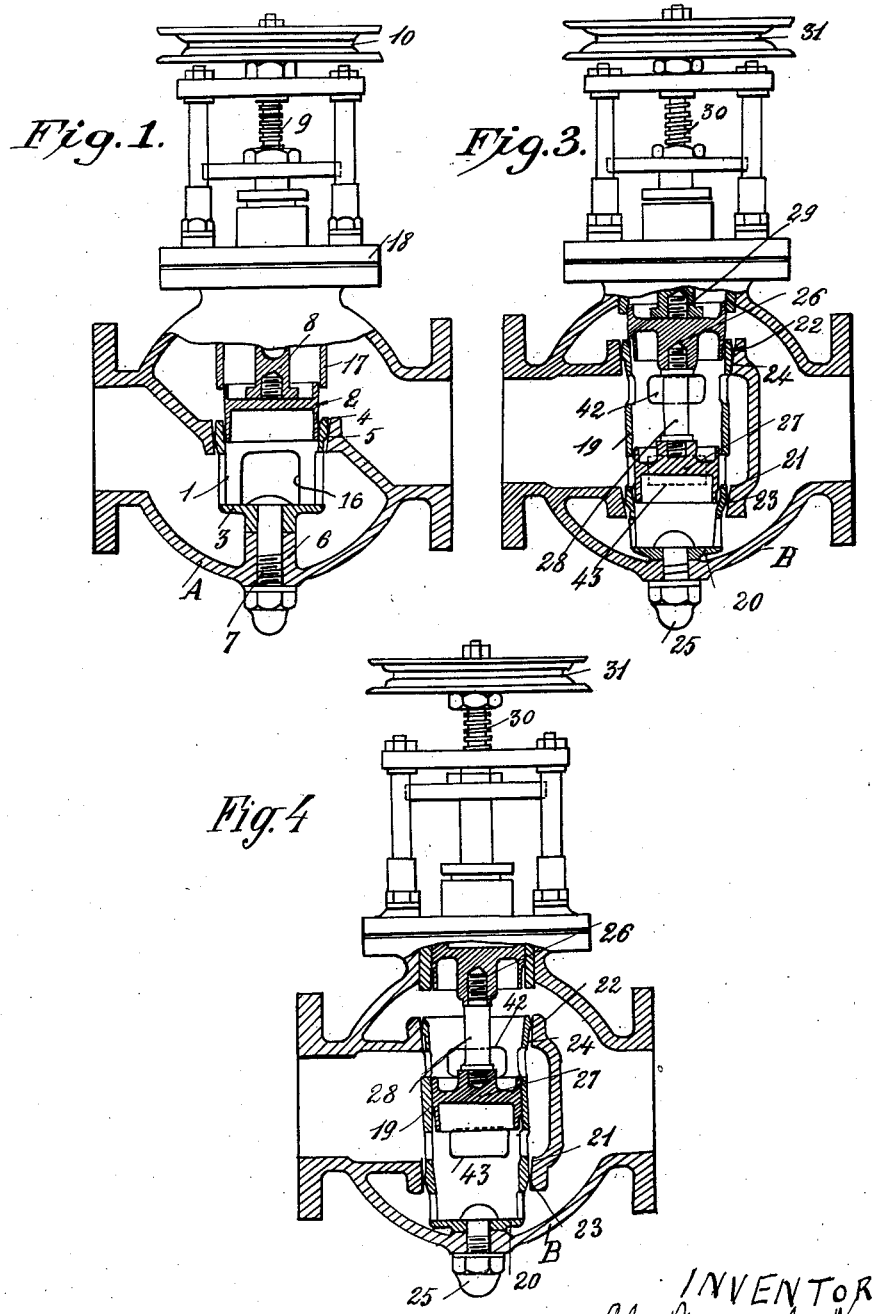

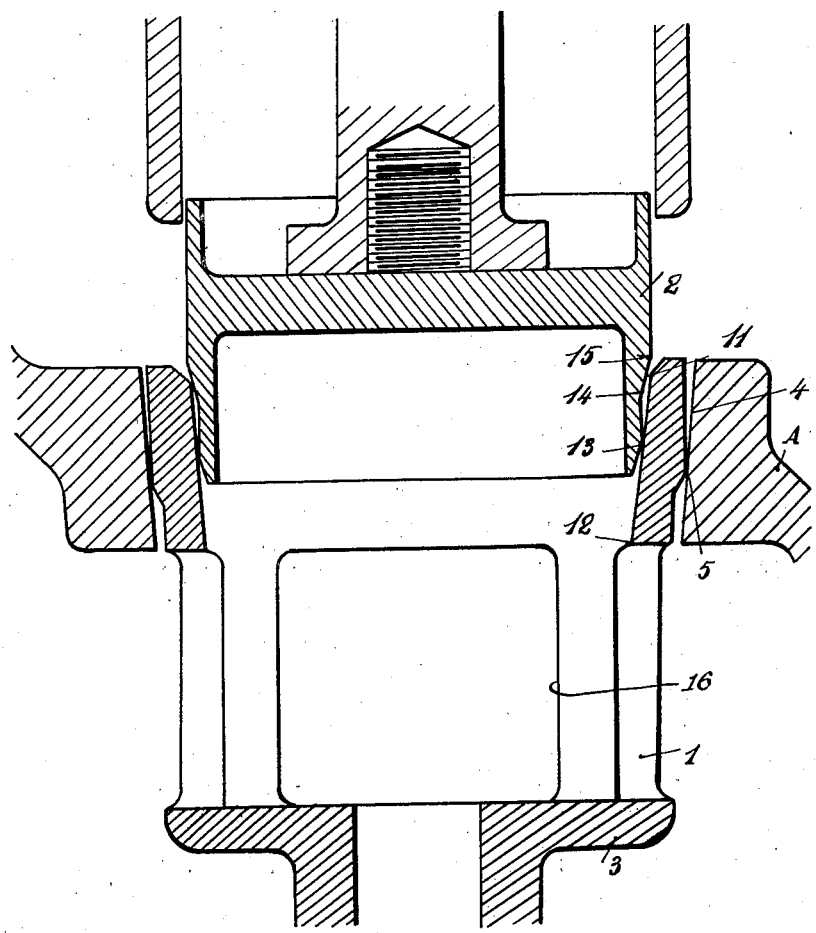

Patented Mar. 27, 1928.

1,664,043

UNITED STATES PATENT OFFICE.

ELIE PIERRE JULES NICLAUSSE AND ALBERT LOUIS NICLAUSSE, OF PARIS, FRANCE.

COCK AND VALVE.

Application filed December 3, 1925, Serial No. 72,876, and in France September 5, 1925.

This invention relates to stop cocks and valves for water or gas or for vapour superheated to high temperatures at high pressures or the like.

The invention is applicable to balanced or unbalanced cocks or valves, and according to this invention a cock or valve comprises, for the purpose of effecting a closure through two successively applied joints:—

(a) A flexible joint formed by the annular contact of the lower portion of a slightly coned valve member with a substantially similar coned surface in the seating; preferably, however, the seating is coned to a larger degree than the valve member.

(b) A rigid joint for perfecting tightness and for limiting the insertion of the valve member and formed by the annular contact of the upper portion of the surface of the seating (which as above stated is slightly conical) with the upper portion of the valve member (which is substantially more conical).

The moving of the valve member upon its seating can be effected by the aid of well known means.

When the valve is being closed the lower coned portion of the valve member forms a flexible joint by contact with the internal surface of the seating and is inserted until the upper conical surface member of the valve makes a rigid joint and closes the valve, the surfaces forming the flexible joint being compressed.

These successive contacts are rendered possible by the compressibility of the material of which the lower portion of the valve member is made and which can be still further enhanced by thinning so as to render it more or less flexible.

The seating may be made removable, and in this latter case may be fixed liquid or gas tight in the body of the apparatus (cock or the like), for example, by the aid of a joint obtained by contact of an annular projection on said seat against a conical surface formed in the body of the apparatus.

With a balanced valve composed of two valve members, such valve members are applied upon their seatings by the aid of flexible and rigid joints in the manner above described.

The invention is illustrated in the accompanying drawings, in which Figure 1 is a longitudinal section of an unbalanced stop valve, Figure 2 shows to a larger scale the unbalanced valve in its position of closure, Figure 3 is a longitudinal section of a balanced stop valve in its closed position, Figure 4 shows the same valve in its fully open position, and Figure 5 shows the balanced valve in its closed position to a larger scale.

Referring to Figures 1 and 2, 1 is a valve seating and 2 a plug. Seating 1 takes the form of a hollow cylinder closed at its end 3. Seating 1 is secured in the body A of the valve in the following manner:—

The body of the valve A is provided with a conical surface 4, and 5 is an obtuse angled stop extending throughout the circumference of seating 1 and turned to a diameter such that when inserted in the body A of the valve the stop 5 comes in contact with cone 4 before the end 3 of the seating has come against a boss 6 on the body of the valve. By screwing up a bolt 7 the bottom of the seating 1 is brought into contact with boss 6, whereby tightness of the joint between 4 and 5 is assured.

Plug 2 is operated through a screw threaded sleeve 8, a screw 9 and a hand wheel 10.

Seating 1 (see Figure 2) is provided with an internal conical surface 11—12, the obtuse angled stop 11 so formed extending throughout the periphery of the seating.

The plug 2 has on it an obtuse stop 13 extending throughout its periphery and which comes into contact with conical surface 11—12 a little before stop 11 comes into contact with a conical surface 14—15 formed on plug 2.

The first contact of stop 13 with the conical surface 11—12 forms a flexible joint and is intended to ensure a tight closure, while the contact of stop 11 with the conical surface 14—15 (which is substantially of greater angle than the conical surface 11—12) forms a rigid joint and is intended to perfect such tightness and to limit the insertion of plug 2 in the seating during the closing operation.

The successive contacts are rendered possible owing to the compressible nature of the material of which plug 2 is formed, which plug is given a very small angle as also is the portion of the seating upon which it bears. The plug 2 may be rendered still more compressible if desired by thinning its lower portion to render it more flexible.

Preferably seating 1 is more coned than plug 2 so as to facilitate the insertion of this latter and properly to ensure the circular joint.

Seating 1 is provided with a series of apertures 16 for the passage of liquid or steam when the plug 2 is raised.

It is to be noted that when the plug is fully open it is housed in a sleeve 17 out of the sphere of the action of the current of water or steam; sleeve 17 is cast together with a cover 18 on the stop valve.

Referring to Figures 3 to 5, which illustrate a balanced valve composed of a seating 19 formed of a hollow cylinder closed at one end 20, seating 19 is inserted and secured in the body B of the valve in the following manner:—

Body B is provided with conical surfaces 21 and 22. Seating 19 is provided with two annular projections 23 and 24 forming obtuse angled stops, which are turned to a diameter slightly greater than that to which they are reduced by compression in passing into the conical surfaces 21 and 22 after screwing up a bolt 25 which serves to secure the seating in the body B. By this means there is obtained with the greatest facility perfect tightness between the two surfaces 21 and 22 and the stops 23 and 24.

26 and 27 are two plug members connected together by a rod 28, this assemblage being operated through a screw threaded sleeve 29, a screw 30 and a hand wheel 31. Member 26 is provided throughout its periphery with an obtuse angled stop 32 which ensures tight closure and which is so arranged as to come into contact, during the closing movement, with the coned surface 33—34 on the seating 19 before the conical surface 35—36 on plug 26 comes into contact with stop 34 on the seating 19.

The contact formed by stop 34 and conical surface 35—36 (which is substantially of greater angle than the conical surface 33—34) forms a rigid joint and has for its object to perfect the tightness of the joint formed between seating 19 and the plug 26 which has already been ensured by contact of stop 32 with the conical surface 33—34 (forming a flexible joint) and to limit the insertion of member 26 into seating 19 to the amount strictly necessary.

These two successive contacts are rendered possible owing to the compressible nature of the material forming the plug which is given a very small angle as also is the portion of the seating with which it engages. This compressibility of the material may be enhanced if desired by thinning the lower portion of the lug which is thus rendered more flexible.

Preferably the seating is coned at a slightly greater angle than the plug so as to facilitate the insertion of this latter and to ensure a joint throughout its periphery.

Member 27 is arranged in an absolutely similar manner to member 26 as regards the seating 19, i. e. it is provided throughout its circumference at 37 with an obtuse stop so arranged as to come into contact with the conical surface 38—39 in the fixed seating 19 before the conical surface 40—41 on the plug member 27 comes into contact with the annular obtuse angular stop 39 on the seating.

As before, the contact of stop 39 with conical surface 40—41, which is substantially of greater angle than conical surface 38—39, has a double object, viz the perfecting of the tight joint between 19 and 27 at 37 and of limiting the insertion of plug 27 into the seating 19.

Matters are so arranged that the two contacts between the seating 19 on the one hand and the two plug members 26 and 27 on the other hand are formed simultaneouly at 32 and at 37 first, and then at 34 and at 39.

In the seating 19 are formed a number of apertures 42 and 43 intended for the passage of liquids or fluids when the valve is opened as shown in Figure 4.

This figure shows that one portion of the liquids or fluids flows through the aperture 42, while the other portion flows through opening 43.

It may be remarked that as the diameters of plugs 26 and 27 are substantially equal the assemblage formed of parts 26—27—28 is substantially balanced and that therefore a very small effort is required to close or to open the valve even when it is of large dimensions and when very high pressures are in questions.

When the apparatus is open as at Figure 4 the two plugs 26 and 27 are placed in a position such that they are completely out of the sphere of action of the current which is conducive to long life.

It will be noted that the valve seating 1 in Figs. 1 and 2, and the valve seating 19 in Figs. 3 to 5 inclusive are reduced in cross section where necessary to give increased flexibility.

What we claim is:—

1. In a valve, cock or the like, the combination of a valve member, a seating for the said valve member, a casing adapted to receive the said seating, and a substantially line contact adapted to be effected between the casing and the seating when the valve member is almost completely moved into the said casing, whereby when the seating has completed its movement into the casing the surfaces forming the contact are compressed.

2. In a valve, cock or the like, the combination of a valve member, a seating for the valve member, a casing adapted to receive the said seating, a plurality of substantially line contacts adapted to be formed between the valve member and seating when the said valve is closed, one of said contacts being effected before the other contact or contacts, whereby the surfaces forming the first contact are compressed, and a substantially line contact adapted to be effected between the casing and the seating when the seating is almost completely moved into the casing, whereby when the seating has completed its movement into the casing the surfaces forming the contact are compressed.

3. In a valve, cock or the like, the combination of a valve member, a seating for the said valve member, a pair of corners or shoulders on the said valve member, and a conical surface on the said seating, one of the corners or shoulders being adapted, as the valve is being closed, to engage the conical seating before the other said corner or shoulder, so that when the valve is closed, the material forming the surfaces first in engagement is compressed.

4. In a valve, cock or the like, the combination of a valve member, a seating for the said valve member, a casing adapted to receive the said seating, a corner or shoulder on the said seating, a conical surface on the said casing, and a stop on the said casing adapted to be engaged by the seating, the corner or shoulder being adapted to engage the conical surface on the casing before the seating engages the stop, so that when the seating is moved to engage the stop the material forming the surfaces in engagement is compressed.

5. In a valve, cock or the like, the combination of a valve member, a seating for the said valve member, a casing adapted to receive the said seating, a pair of corners or shoulders on the said valve member, a conical surface on the said seating, one of the corners or shoulders being adapted, as the valve is being closed, to engage the conical seating before the other said corner or shoulder, so that when the valve is closed, the material forming the surfaces first in engagement is compressed, a corner or shoulder on the said seating, a conical surface on the said casing, and a stop on the said casing adapted to be engaged by the seating, the corner or shoulder being adapted to engage the conical surface on the casing before the seating engages the stop, so that when the seating is moved to engage the stop the material forming the surfaces in engagement is compressed.

6. In a valve, cock or the like, the combination of a valve member, a portion of said member being reduced in cross section to give increased flexibility, a seating for the said valve member, a pair of corners or shoulders on the said member, and a conical surface on the said seating, one of the corners or shoulders being adapted, as the valve is being closed, to engage the conical seating before the other said corner or shoulder, so that when the valve is closed, the material forming the surfaces first in engagement is compressed.

7. In a valve, cock or the like, the combination of a valve member, a seating for the said valve member, a portion of said seating being reduced in cross section to give increased flexibility, a casing adapted to receive the said seating, a corner or shoulder on the said seating, a conical surface on the said casing, and a stop on the said casing adapted to be engaged by the seating, the corner or shoulder being adapted to engage the conical surface on the casing before the seating engages the stop, so that when the seating is moved to engage the stop the material forming the surfaces in engagement is compressed.

8. In a valve, cock or the like, the combination of a valve member having a portion reduced in cross section to give increased flexibility, a seating for the said valve member, a portion of said seating being reduced in cross section to give increased flexibility, a casing adapted to receive the said seating, a pair of corners or shoulders on the said valve member, a conical surface on the said seating, one of the corners or shoulders being adapted, as the valve is being closed, to engage the conical seating before the other said corner or shoulder, so that when the valve is closed, the material forming the surfaces first in engagement is compressed, a corner or shoulder on the said seating, a conical surface on the said casing, and a stop on the said casing adapted to be engaged by the seating, the corner or shoulder being adapted to engage the conical surface on the casing before the seating engages the stop, so that when the seating is moved to engage the stop the material forming the surfaces in engagement is compressed.

9. In a balanced valve, cock or the like, the combination of a valve member, a seating for the said valve member, two pairs of corners or shoulders on the said valve member, and a pair of conical surfaces on the said seating, one of each pair of corners or shoulders being adapted, as the valve is being closed, to engage the conical seatings before the other said corner or shoulder, so that when the valve is closed, the material forming the surfaces first in engagement is compressed.

10. In a balanced valve, cock or the like, the combination of a valve member, a seating for the said valve member, a casing adapted to receive the said seating, a pair of corners or shoulders on the said seating, a pair of conical surfaces on the said casing, and a stop on the said casing adapted to be engaged by the seating, the said corners or shoulders being adapted to engage the conical surfaces on the casing before the seating engages the stop, so that when the seating is moved to engage the stop, the surfaces in engagement between the seating and casing are compressed.

11. In a balanced valve, cock or the like, the combination of a valve member, a seating for the said valve member, a casing adapted to receive the said seating, two pairs of corners or shoulders on the said valve member, a pair of conical surfaces on the said seating, one of each pair of corners or shoulders being adapted, as the valve is being closed, to engage the conical seating before the other said corner or shoulder, so that when the valve is closed, the material forming the surfaces first in engagement is compressed, a pair of corners or shoulders on the said seating, a pair of conical surfaces on the said casing, and a stop on the said casing adapted to be engaged by the seating, the said corners or shoulders being adapted to engage the conical surfaces on the casing before the seating engages the stop, so that when the seating is moved to engage the stop, the surfaces in engagement between the seating and casing are compressed.

In testimony whereof we have affixed our signatures.

JULES NICLAUSSE.
ALBERT NICLAUSSE.